US007200603B1

(12) United States Patent
Hitz et al.

(10) Patent No.: US 7,200,603 B1
(45) Date of Patent: Apr. 3, 2007

(54) IN A DATA STORAGE SERVER, FOR EACH SUBSETS WHICH DOES NOT CONTAIN COMPRESSED DATA AFTER THE COMPRESSION, A PREDETERMINED VALUE IS STORED IN THE CORRESPONDING ENTRY OF THE CORRESPONDING COMPRESSION GROUP TO INDICATE THAT CORRESPONDING DATA IS COMPRESSED

(75) Inventors: David Hitz, Los Altos, CA (US); Mehul S. Shah, Milpitas, CA (US); Daniel W. Ting, Palo Alto, CA (US); James J. Voll, Palo Alto, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 506 days.

(21) Appl. No.: 10/755,020

(22) Filed: Jan. 8, 2004

(51) Int. Cl.
*G06F 17/00* (2006.01)
*G06F 17/30* (2006.01)
*G06F 13/12* (2006.01)
*G06K 9/36* (2006.01)
*H04K 1/00* (2006.01)

(52) U.S. Cl. .............................. 707/101; 707/1; 707/10; 707/104.1; 707/205; 382/232; 710/68; 380/269

(58) Field of Classification Search ................. 707/1–2, 707/10, 100–101, 104.1, 205; 714/4, 13; 709/213–218; 711/112–117, 154, 160–163; 380/269; 710/68; 382/232–233
See application file for complete search history.

(56) References Cited

U.S. PATENT DOCUMENTS 5,403,639 A * 4/1995 Belsan et al. ............... 707/204

(Continued)

FOREIGN PATENT DOCUMENTS

EP          1333379          * 8/2003

(Continued)

OTHER PUBLICATIONS

Schindler,M et al. "a fast block-sorting algorithm for lossless data compression", proceddings in data compression conference 1997, p. 469.*

(Continued)

*Primary Examiner*—Srirama Channavajjala
(74) *Attorney, Agent, or Firm*—Blakely Sokoloff Taylor & Zafman LLP

(57) ABSTRACT

In a technique for compressing data, a data storage server receives a set of data, which includes a first number of subsets. The storage server defines a number of compression groups for the set of data, each compression group including multiple entries, each entry containing a pointer to a different subset of the set of data. At least part of the set of data is then compressed into a smaller number of subsets. For each of the subsets which does not contain compressed data after the compression, a predetermined value is stored in the corresponding entry of the corresponding compression group, to indicate that corresponding data is compressed and represented elsewhere in the compression group. The predetermined value may also indicate which compression algorithm was used to compress the data.

38 Claims, 7 Drawing Sheets

U.S. PATENT DOCUMENTS

| | | | |
|---|---|---|---|
| 5,760,716 A * | 6/1998 | Mathews et al. | 341/50 |
| 5,774,715 A | 6/1998 | Madany et al. | |
| 5,813,017 A * | 9/1998 | Morris | 707/204 |
| 5,850,565 A * | 12/1998 | Wightman | 710/1 |
| 6,138,126 A * | 10/2000 | Hitz et al. | 707/202 |
| 6,157,743 A * | 12/2000 | Goris et al. | 382/233 |
| 6,163,856 A * | 12/2000 | Dion et al. | 714/4 |
| 6,374,250 B2 * | 4/2002 | Ajtai et al. | 707/101 |
| 6,418,449 B1 * | 7/2002 | Chen et al. | 707/104.1 |
| 6,457,130 B2 * | 9/2002 | Hitz et al. | 726/27 |
| 6,532,121 B1 * | 3/2003 | Rust et al. | 360/8 |
| 6,574,591 B1 * | 6/2003 | Kleiman et al. | 707/203 |
| 6,604,106 B1 * | 8/2003 | Bodin et al. | 707/101 |
| 6,640,233 B1 * | 10/2003 | Lewis et al. | 707/205 |
| 6,721,764 B2 * | 4/2004 | Hitz et al. | 707/202 |
| 6,779,095 B2 * | 8/2004 | Selkirk et al. | 711/165 |
| 6,795,583 B1 * | 9/2004 | Barnes et al. | 382/239 |
| 6,804,733 B1 * | 10/2004 | Michel et al. | 710/68 |
| 6,842,872 B2 * | 1/2005 | Yedida et al. | 714/703 |
| 6,934,877 B2 * | 8/2005 | Tamatsu | 714/5 |
| 6,965,897 B1 * | 11/2005 | Chen | 707/100 |
| 7,096,311 B2 * | 8/2006 | Chiang | 711/100 |
| 7,099,884 B2 * | 8/2006 | Gu | 707/101 |
| 7,110,608 B2 * | 9/2006 | Chan et al. | 382/239 |
| 2002/0069317 A1 * | 6/2002 | Chow et al. | 711/104 |
| 2003/0149793 A1 * | 8/2003 | Bannoura et al. | 709/247 |
| 2003/0217067 A1 * | 11/2003 | Gilstrap et al. | 707/100 |
| 2004/0255140 A1 * | 12/2004 | Margolus et al. | 713/193 |
| 2005/0182799 A1 * | 8/2005 | Hitz et al. | 707/202 |

FOREIGN PATENT DOCUMENTS

| | | | |
|---|---|---|---|
| GB | 2413867 | * | 11/2005 |
| WO | WO 97/39421 | * | 10/1997 |
| WO | WO 99/13403 | * | 3/1999 |
| WO | WO 01/29752 | * | 4/2001 |
| WO | WO 01/50612 | * | 7/2001 |
| WO | WO 2006/063057 | * | 6/2006 |

OTHER PUBLICATIONS

Shapira,D et al. "in-place differential file compression of nonaligned files with applications to file distribution, backups, and string similarity",proceedings of the data compression confierence, Mar. 2004, pp. 82-91.*

Saeed,F et al. "data compression with Huffman coding; an efficient dynamic implementation using file partitioning", proceedings of the 1990 symposium on applied computing, 1990, pp. 348-354.*

Damon John Searle, "A multi-tier scientific data distribution system", Jan. 2004.*

Ghim Hwee Ong, "A multi-block data compression method based on arthmetic coding for a library database",Communications on the move, Singapore ICCS/ISITA, '92, vol. 3, pp. 1067-1071.*

Summit Roy et al. "improving system performance with compressed memory", IEEE 2001.*

Ramabadran,T.V. et al. "An adaptive algorithm for the compression of computer data", IEEE transactions on communications, vol. 37, issue: 4, 1989, pp. 317-324.*

Feng Xiaodong et al. "An improved process data compression Algorithm", proceedings of the 4th world congress on intelligent control and automation, Jun. 2002, pp. 2190-2193.*

* cited by examiner

IN A DATA STORAGE SERVER, FOR EACH SUBSETS WHICH DOES NOT CONTAIN COMPRESSED DATA AFTER THE COMPRESSION, A PREDETERMINED VALUE IS STORED IN THE CORRESPONDING ENTRY OF THE CORRESPONDING COMPRESSION GROUP TO INDICATE THAT CORRESPONDING DATA IS COMPRESSED

FIELD OF THE INVENTION

At least one embodiment of the present invention pertains to data storage servers, and more particularly, to compressing data in a data storage server.

BACKGROUND

Various types of storage servers are used in modern computing systems. One type of storage server is a file server. A file server is a storage server which operates on behalf of one or more clients to store and manage shared files in a set of mass storage devices, such as magnetic or optical storage based disks. The mass storage devices are typically organized as one or more groups of Redundant Array of Independent (or Inexpensive) Disks (RAID). One configuration in which file servers can be used is a network attached storage (NAS) configuration. In a NAS configuration, a file server can be implemented in the form of an appliance, called a filer, that attaches to a network, such as a local area network (LAN) or a corporate intranet. An example of such an appliance is any of the NetApp Filer products made by Network Appliance, Inc. in Sunnyvale, Calif.

A file server can be used for a variety of purposes, such as to backup critical data. One particular type of data backup technique is known as "mirroring", which involves backing up data stored at a primary site by storing an exact duplicate (an image) of the data at a remote secondary site. The goal of mirroring is that if data is ever lost at the primary site, it can be recovered from the mirror copy at the secondary site. In a simple mirroring configuration, a source file server located at a primary storage site may be coupled locally to a first set of mass storage devices (e.g., disks), to a set of clients through a local area network (LAN), and to a destination file server located at a remote storage site through a wide area network (WAN) or metropolitan area network (MAN). The destination storage server located at the remote site is coupled locally to a second set of mass storage devices (e.g., disks) at the secondary site.

In operation, the source file server receives and services various read and write requests from its clients. Write requests are generally buffered for some period of time that depends on the available system resources, network bandwidth and desired system performance. From time to time, during an event called a "consistency point", the source file server stores new or modified data in its local mass storage devices based on the buffered write requests. Also, from time to time, new or modified data is sent from the source file server to the destination file server, so that the data stored at the secondary site can be updated to mirror the data at the primary site (i.e., to be a consistent image of the data at the primary site).

In a data storage system such as a file server, it is desirable to reduce the cost of storing data. One way of achieving this is to reduce the amount of data that needs to be stored, such as by using compression. In the known prior art, certain data backup systems have used explicit compression and decompression techniques at the application level (i.e., in the client) to accomplish this. However, that approach requires special software to be built into the client applications. Other backup based systems such as tape drives and disk controllers have used built-in hardware compression to achieve similar goals, but not at the file system level. To incorporate a hardware based disk controller would require another layer of software to maintain a separate disk block mapping and is therefore undesirable for many purposes. The failure of such a card or software would render the data inaccessible and would provide a potential failure point.

File system based compression avoids this kind of failure point. At least one known file system based approach attempts to find duplicate blocks of data by utilizing a unique cryptographic hash signature of the data. Such approaches tend to offer good compression ratios in the presence of a large number of duplicated files (e.g., multiple independent versions of the same or nearly the same file) but have experienced severe performance problems to date.

Another problem with file system based approaches has been that compressing or decompressing extremely large data sets, such as databases, tends to require extremely large amounts of processing resources, such as CPU time and memory, especially in the presence of random input/output (I/O) workloads. For example, to decompress only the last 4 kbytes of data in a 100 Gbyte database would require the reading and processing of the full 100 Gbytes of data if the whole file was compressed at once.

SUMMARY OF THE INVENTION

The present invention includes a method and apparatus for compressing data. In the method, a set of data having a first number of subsets is received. A compression group corresponding to the set of data is defined. The compression group has multiple entries, each entry containing a pointer to a corresponding one of the subsets. The set of data is compressed so that the set of data occupies a smaller number of the subsets than the first number. For each of the subsets which does not contain compressed data after the compressing, a predetermined value is stored in the corresponding entry of the compression group, to indicate that corresponding data is compressed.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

A method and apparatus for compressing data in a storage server are described. Note that in this description, references to "one embodiment" or "an embodiment" mean that the feature being referred to is included in at least one embodiment of the present invention. Further, separate references to "one embodiment" or "an embodiment" in this description do not necessarily refer to the same embodiment; however, such embodiments are also not mutually exclusive unless so stated, and except as will be readily apparent to those skilled in the art from the description. For example, a feature, structure, act, etc. described in one embodiment may also be included in other embodiments. Thus, the present invention can include a variety of combinations and/or integrations of the embodiments described herein.

As described in greater detail below, in certain embodiments of the invention, a data storage server, such as a file server, implements data compression within its file system. A set of data to be compressed/decompressed may be, for example, a file which includes a number of blocks, as henceforth assumed in this description to facilitate explanation. Other embodiments may operate on units of data other than files and/or blocks, however.

The storage server defines multiple "compression groups" from a file. In certain embodiments, for example, a compression group represents a fixed-size set of logically adjacent blocks in a file. Each entry in a compression group points to a different block of the file. Compression or decompression is then done independently for each compression group, to the extent the underlying data is suitable for compression.

For each block which does not contain compressed data after compression, a predetermined block number is stored in the corresponding entry of the corresponding compression group, in place of the actual block number. The predetermined block number indicates that the corresponding data is compressed (and therefore represented by a different entry in the compression group). The predetermined block number may also indicate other information, such as which compression algorithm was used to compress the data. These features are described in greater detail below.

Figure 1:
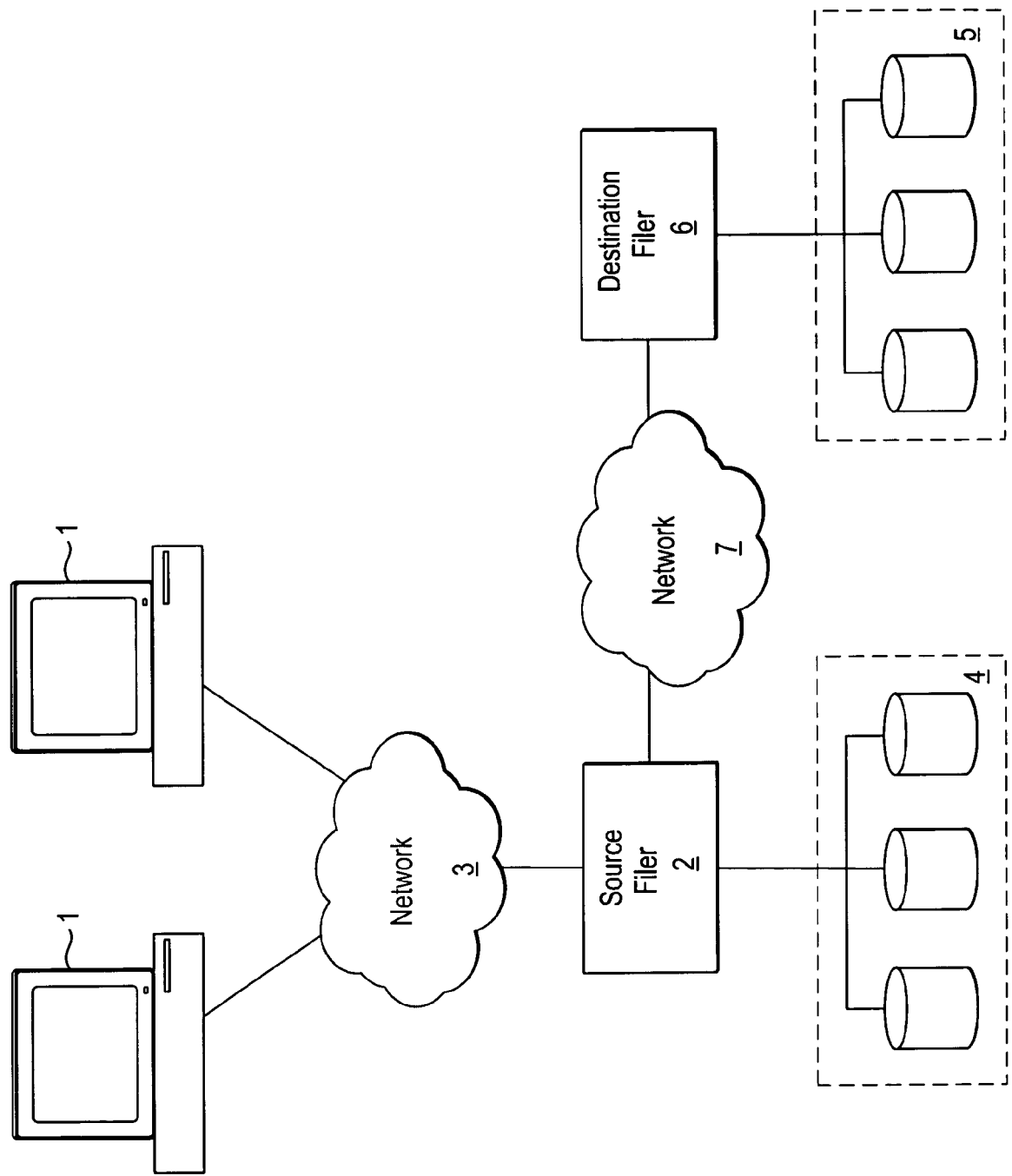
FIG. 1 illustrates a data mirroring configuration in which the invention can be implemented.

FIG. 1 illustrates an example of a network configuration to facilitate data backup using mirroring, in which the compression/decompression techniques introduced herein may be employed. Of course, the compression/decompression techniques can also be employed in many other types of environments. The illustrated system includes two filers 2 and 6, which may implement the compression/decompression techniques. A number of client processing systems ("clients") 1 are coupled to filer 2 located at a primary site through a first network 3, such as a LAN. Each of the clients 1 may be, for example, a conventional personal computer (PC), workstation, or the like. The filer 2 provides the clients 1 with access to files stored on a first set of mass storage devices 4, such as magnetic or optical disks, which may be configured as one or more RAID groups. Data stored in mass storage devices 4 is considered to be the primary copy, which is mirrored on a second set of mass storage devices 5 located at a remote secondary site, access to which is controlled by a second filer 6. In this description, the first filer 2 is referred to as the "source filer" 2, while the second filer 6 is referred to as the "destination filer" 6. The source filer 2 and destination filer 6 are coupled to each other through a network 7, such as a WAN or MAN. Networks 3 and 7 each may be, for example, a TCP/IP network or a FibreChannel network. As described further below, techniques of the present invention can be implemented within the source filer 2 or the destination filer 6.

Figure 2:
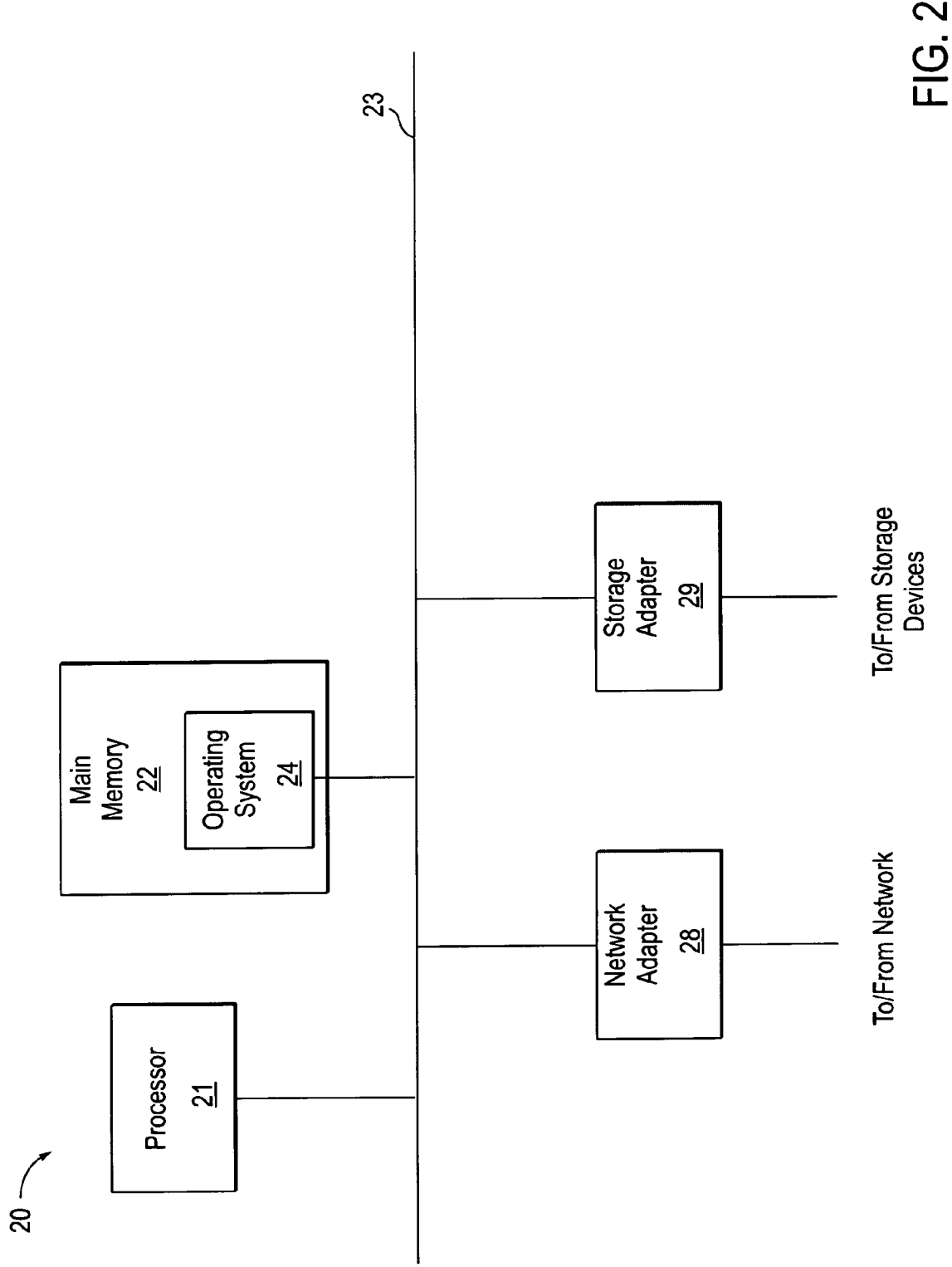
FIG. 2 is a conceptual block diagram of the architecture of a filer.

FIG. 2 shows the architecture of a filer 20, representative of the source filer 2 or the destination filer 6, according to certain embodiments of the invention. Note that certain standard and well-known components which are not germane to the present invention are not shown. The filer 20 includes a processor 21 and main memory 22, coupled together by a bus system 23. The bus system 23 in FIG. 2 is an abstraction that represents any one or more separate physical buses and/or point-to-point connections, connected by appropriate bridges, adapters and/or controllers. The bus system 23, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processor 21 is the central processing unit (CPU) of the filer 20 and, thus, controls the overall operation of the filer 20. In certain embodiments, the processor 21 accomplishes this by executing software stored in main memory 22. The processor 21 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The main memory 22, which is generally some form of random access memory (RAM), stores the operating system 24 of the filer 20. Techniques of the present invention may be implemented within the operating system 24, as described further below.

Also connected to the processor 21 through the bus system 23 are a network adapter 28 and a storage adapter 29. The network adapter 28 provides the filer 20 with the ability to communicate with remote devices, such as clients and/or another filer, over a network and may be, for example, an Ethernet adapter. The storage adapter 29 allows the filer to access the external mass storage devices and may be, for example, a Fibre Channel adapter or SCSI adapter.

Figure 3:
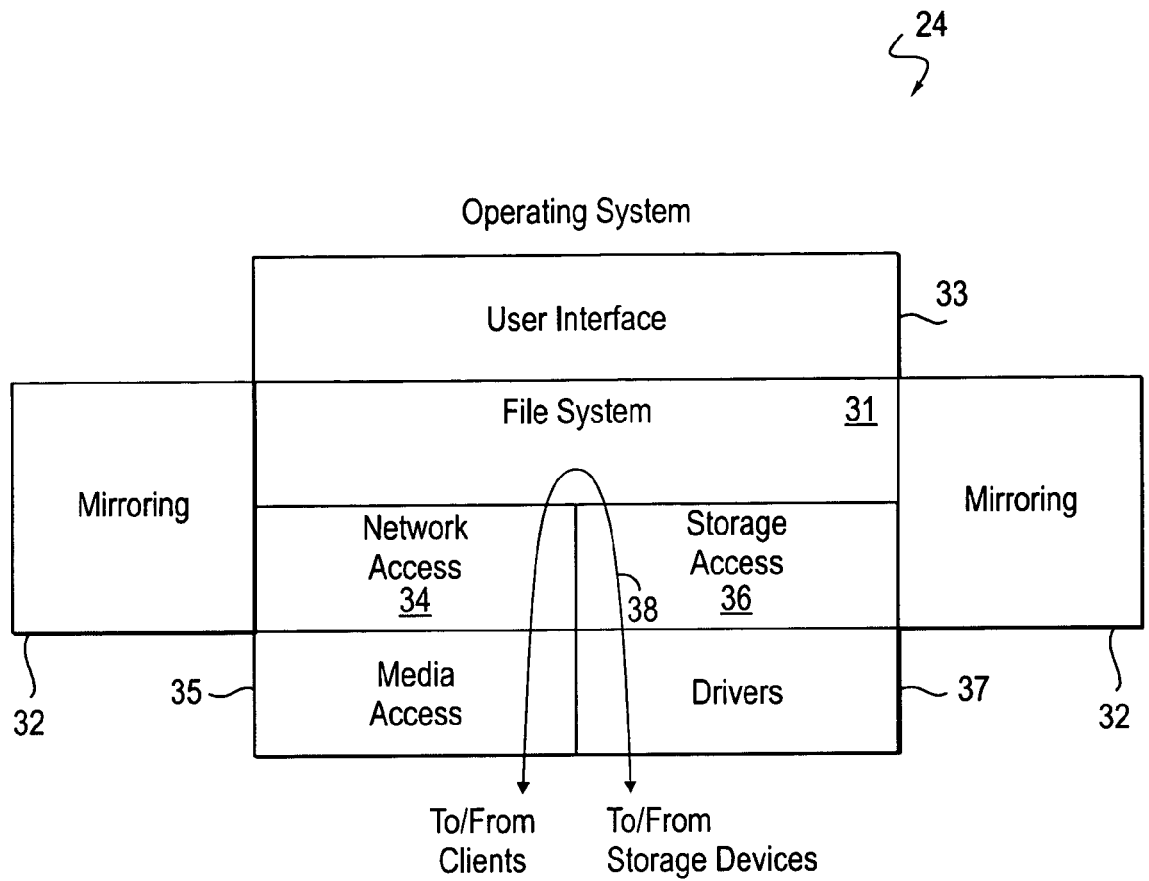
FIG. 3 is a block diagram of the operating system of a filer.

FIG. 3 illustrates the operating system 34 of the filer 20, according to certain embodiments of the invention. As can be seen, the operating system 24 includes a number of layers. The core of the operating system 24 is the file system 31 which, among other responsibilities, executes read and write operations on the mass storage devices in response to client requests, maintains directories, and manages consistency point operations. An example of a file system suitable for this purpose is the Write Anywhere File Layout to (WAFL) file system from Network Appliance, such as used in NetApp Filers. The file system 31 operates on blocks of data of a predetermined size, such as 4 kbytes. The compression/decompression techniques introduced herein may be implemented within the file system 31. Also shown in FIG. 3 is the logical data path 38 from clients to mass storage devices, through the file system 31.

Above the file system 31, the operating system 24 also includes a user interface 33, through which a network administrator or other user can control and/or configure the filer (e.g., remotely from a management station). The user interface 33 may generate a command line interface and/or a graphical user interface for this purpose.

Below the file system 31, on the client side the operating system 24 includes a network layer 34 and, at the lowest level, a media access layer 35. The network access layer 34 implements any of various protocols used to communicate with client devices, such as network file system (NFS), common Internet file system (CIFS) and/or hypertext transport protocol (HTTP). The media access layer 35 includes one or more drivers which implemented the protocols used to communicate over the network, such as Ethernet.

Below the file system 31 on the storage device side, the operating system 24 includes a storage access layer 36 and, at the lowest level, a driver layer 37. The storage access layer 36 implements a disk storage protocol such as RAID, while the driver layer 37 implements a lower-level storage device access protocol, such as Fibre Channel or SCSI.

The operating system of 24 also includes a mirroring module 32 (on both the network and storage sides), which is operatively coupled to the file system 31 and the storage access layer 36. The mirroring module 32 controls the synchronization of data at the remote secondary site with data stored at the primary site.

Figure 4:
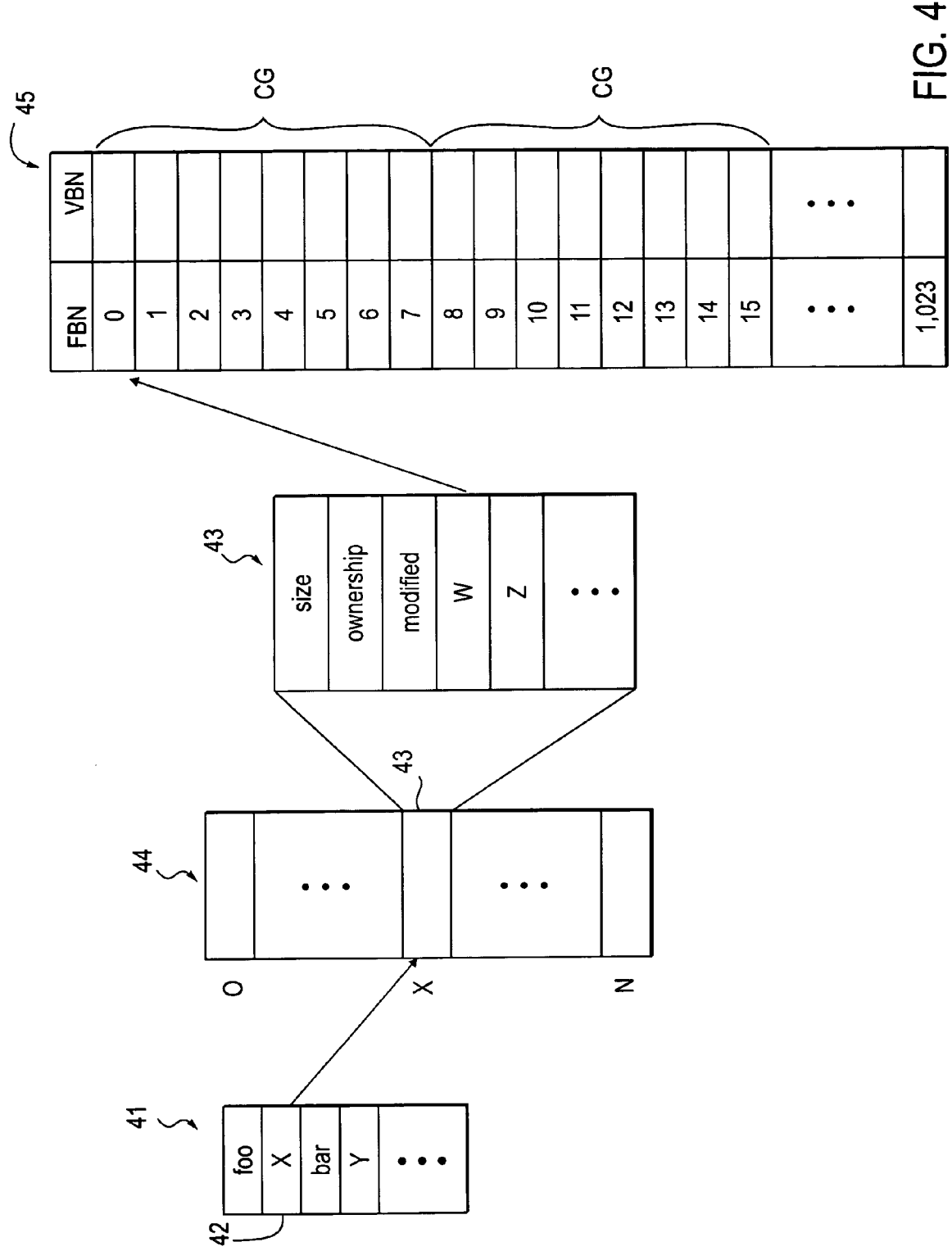
FIG. 4 illustrates the use of compression groups defined with respect to an indirect node of a file.

As mentioned above, the techniques introduced herein involve the use of "compression groups" to facilitate compression and decompression. In certain embodiments, the file system 31 is based on the use of inodes and indirect blocks, such as used in a Unix or Linux environment. FIG. 4 illustrates the use of compression groups in accordance with such embodiments. The file system 31 includes a file directory 41. In the illustrated example, the directory 41 includes references to two files, named "foo" and "bar". The directory 41 stores, in association with each filename, the location 42 of the inode 43 for the file. Each file maintained by the file system has an inode within an inode file 44.

Each file is represented by one or more indirect blocks, such as indirect block 45. The inode 43 of a file includes various items of information about that file, including the file size, ownership, last modified time/date, and the location of each indirect block 45 of the file. Each indirect block 45 includes a number of entries (1,024 entries in the illustrated example). Each entry in the indirect block 45 contains a volume block number (VBN) and can be located using a file block number (FBN) given in a request (e.g., a read request). The FBNs are index values which represent sequentially all of the blocks that make up the data represented by indirect block (e.g., 0 through 1,023). Each VBN is a pointer to the physical location at which the corresponding FBN is stored on disk. In certain embodiments, the file system 31 operates on 4 kbytes sized blocks of data, and each FBN/VBN pair corresponds to a different 4 kbyte block.

In accordance with certain embodiments of the invention, every eight consecutive VBNs in each indirect block are defined as representing a compression group (CG). Thus, each compression group represents 32 kbytes (8×4 kbytes) of uncompressed data in the current example. After compression, the VBNs in the compression group may point to data blocks that contain compressed data, or they may indicate "compression holes" (blocks which no longer contain valid data due to the compression) using a special, predetermined VBN. The predetermined VBN may also indicate other information, such as which compression algorithm was used to compress the data (and, therefore, which decompression algorithm should be used), whether compression was done by software or a hardware accelerator, etc.

Note that in other embodiments, a compression group can be defined as a different number of consecutive VBNs of an indirect block, or as a predetermined number of pointers in an inode, or in some other manner. The simplest compression group would be two adjacent VBNs (representing 8 kbytes of data in the current embodiment). The first VBN is marked as the start of the compression group and contains the compressed data for the whole 8 kbytes of data in the compression group in this example. The second VBN is simply marked as a compression hole using the special VBN.

Compression is performed independently for each compression group, provided the underlying data is suitable for compression. Data may be unsuitable for compression if, for example, it is merely metadata used by the file system 31, if prior attempts at compressing the data were unsuccessful, or if compression will not substantially reduce the amount of storage space consumed. For large files such as databases and logical unit numbers (LUNs), the type of data stored within the file may vary, and therefore, some parts of the file may be highly compressible while other parts are not.

By breaking up the file into smaller units of compression, therefore, the compression group approach avoids a disadvantage of prior compression techniques, in which compression of a file is precluded if even a small portion of the file is unsuitable for compression. Hence, it becomes possible to optimize the storage savings where possible and leave as uncompressed the parts of the file that show poor compressibility, thereby conserving system resources.

Note that it is only beneficial to compress the data when the end result is at least one VBN representing a compression hole in a compression group. For instance, using an example in which only two consecutive VBNs represents a compression group, if we can only compress the original 8 kbytes of data down to 5 kbytes, then two 4-kbyte data blocks would still be required to hold all of the compressed data, and no disk space would be saved. So in that case, compression would not be performed for that compression group. It may be desirable to impose a minimum amount of storage space which must be saved by compression in order for compression to proceed for any given compression group.

There is a trade-off in how big compression groups should be and where they can start. If compression groups are large (e.g., 128 kbytes), then a large amount of CPU processing, additional I/O and possibly memory is required to retrieve a single block of uncompressed data. For workloads that read whole files sequentially, this is not an overriding concern, since this work needs to be done anyway. However, for workloads that randomly read selected chucks of a file, the result may very well be decompressing large chucks of a file just to retrieve a small section of data. This involves more I/O, since it is necessary to read all of the compressed data blocks of a whole compression group. Note that it is desirable to avoid as much extra I/O as possible when decompressing data, so having compression groups span indirect blocks should be avoided. Note also that in certain embodiments of the invention, the size of compression groups can be varied dynamically.

Figure 5:
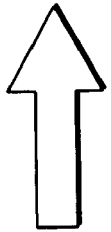
FIG. 5 shows an example of a compression group before and after compression.

FIG. 5 shows an example of a compression group, using compression group size of eight blocks (32 kbytes). Before compression, a group 52 of level 0 block numbers may appear as shown on the left. After compression the compression group 52 might appear as shown on the right. The special VBN labeled CG_VBN is used to denote a block whose content is contained elsewhere in the compression group. In this example, to determine whether VBNs 4092, 4177 or 1234 contain compressed data, we sequentially scan the VBNs in the associated compression group to determine whether it contains the special compression VBN (CG_VBN). If so, this means the blocks within this compression group of eight VBNs hold compressed data.

To avoid large fragmentation issues, the last compression group in a file may not contain a full 32 kbytes worth of data. As long as there is at least 8 kbytes+1 byte of data in a compression group, an attempt is made to compress it. This means, in effect, that the minimal size of a file eligible for compression is 8 kbytes+1 (three file system blocks).

Decompression is triggered during a read operation whenever the special compression VBN is detected in the relevant compression group. In order to decompress a block with compressed data, the data of the whole compression group is read and decompressed. In the example of FIG. 5, if FBN 2 is requested, the file system 31 scans the VBN values sequentially starting from FBN 0, before attempting to read any of the data from disk. When CG_VBN is detected in FBN 3, the file system 31 knows that the compression group 52 is compressed. Nonetheless, using units of compression smaller than a file allows the more precise decompression and retrieval of only the data of interest (e.g., one only needs to decompress a 32 kbyte compression group in order to retrieve a desired 4 kbyte block of data in the exemplary embodiment). Having to decompress and compress the contents of a whole file for partial access to the data would be a huge resource drain and can be avoided by using compression groups in accordance with the invention.

Note that for random read workloads of uncached data, additional I/O is required when decompressing data, since the compressed data at a given offset can only be found by decompressing the data of the whole compression group. However, for sequential read workloads of uncached data, less I/O is required, since the compressed data fits in fewer disk blocks than the uncompressed data.

Various modifications and extensions can be made to the technique introduced above, to provide further advantages. For example, compression can be performed in a manner which is transparent to the end-user. There are at least three approaches to transparent compression: First, data can be compressed during a consistency point event when storage medium blocks (VBNs) are being assigned for the data that is to be written. Second, data can be compressed during a background process. Third, data can be compressed as part of the file system write process (when data is first received by the file system 31 from a client 1 as part of a write request). Each of these approaches has various advantages and disadvantages.

Figure 6:
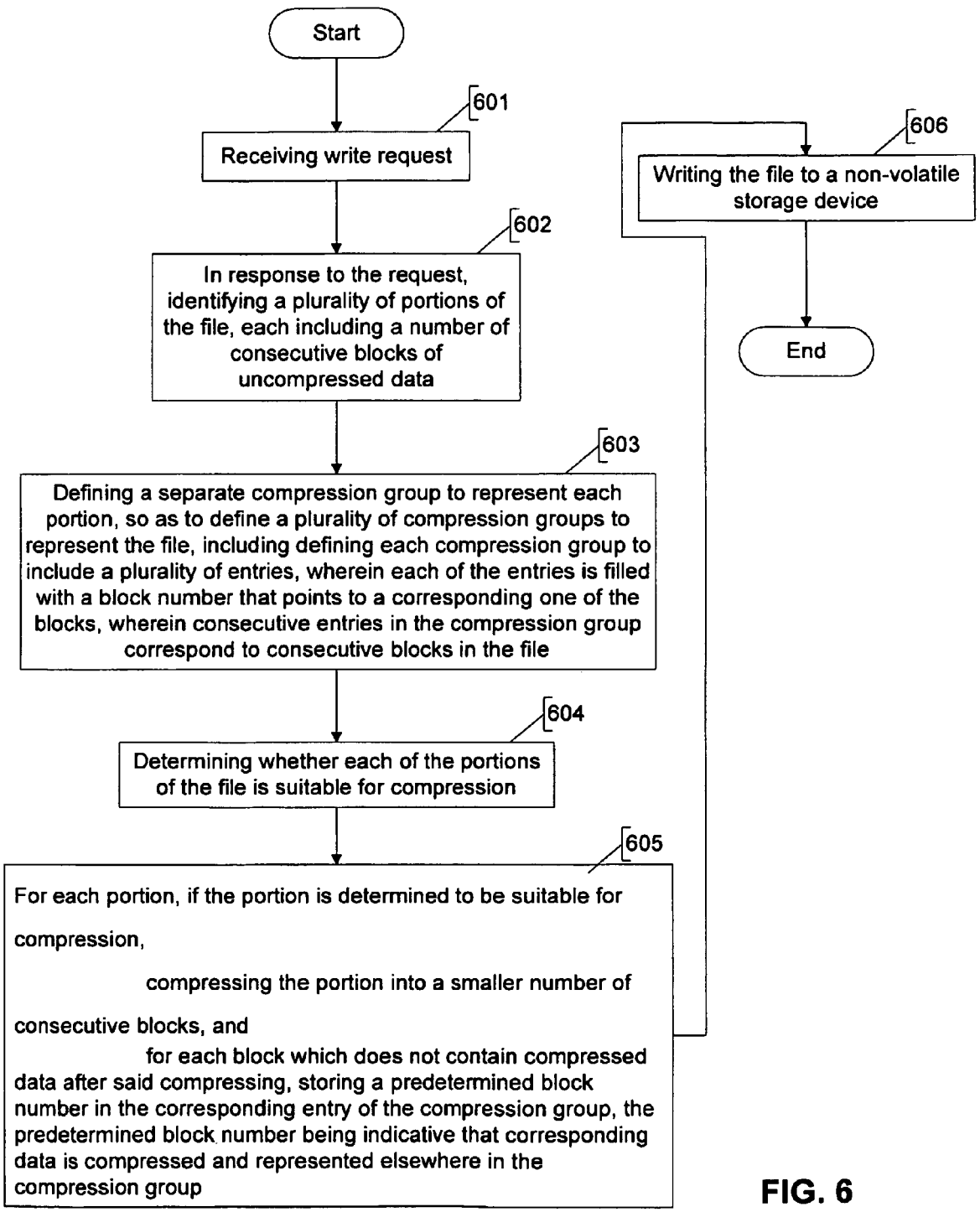
FIG. 6 shows an example of the process of compressing data as part of the file system write process.

FIG. 6 shows an example of the process of compressing data as part of the file system write process. The process begins with receiving write request (601). In response to the request, a plurality of portions of the file are identified, each including a number of consecutive blocks of uncompressed data (602). Next, a separate compression group is defined to represent each portion, so as to define a plurality of compression groups to represent the file, including defining each compression group to include a plurality of entries, wherein each of the entries is filled with a block number that points to a corresponding one of the blocks, wherein consecutive entries in the compression group correspond to consecutive blocks in the file (603).

The process next determines whether each of the portions of the file is suitable for compression (604). For each portion (605), if the portion is determined to be suitable for compression, then that portion is compressed into a smaller number of consecutive blocks; and for each block which does not contain compressed data after said compressing, a predetermined block number is stored in the corresponding entry of the compression group, the predetermined block number being indicative that corresponding data is compressed and represented elsewhere in the compression group. Finally, the file is written to a non-volatile storage device (606).

In certain embodiments, the file system 31 may use a "snapshot" approach to storing data, in which a data block on disk is never reused once it has been written to (as in the WAFL file system of Network Appliance). In such a system, performing compression during a consistency point may be desirable, since it avoids the redundant use of disk space that would occur if the data were to be saved to disk prior to compression (i.e., the same data would also be saved elsewhere on disk after compression). Furthermore compression during a consistency point avoids redundant compression of a compression group if any data block in a compressed compression group were to be modified before the compression group is committed to disk. In addition, compression during a consistency point tends to require fewer I/O operations to compress data compared to other approaches, because the data has not been written to disk at all yet, so the data need only be written once. With other approaches, the data could be written out (uncompressed) and then reread from disk in order to compress it and rewrite it.

In certain embodiments, because compression/decompression can be time-consuming, the compression/decompression is applied before the actual access to the data is required, to reduce latency. This technique is referred to as "compress/decompress ahead". For example, in response to a read request, if the special VBN is detected in any entry of the compression group, the entire compression group is immediately decompressed, as noted above. Decompress ahead may also be used when encountering a sequential read access pattern. During a write operation, as soon as enough consecutive entries of an indirect block to form a compression group (eight entries in the examples above) have been filled, those entries are immediately compressed and written to disk if all of the data in the compression group is suitable for compression, even if no other blocks of data have been received yet.

In certain embodiments of the invention, to improve latency the file system 31 retains both the compressed data and the uncompressed version of the data in memory, as long as sufficient memory space is available. This approach avoids the need for time-consuming decompression of the data in the event of a subsequent read or write on the same data. For example, in response to a read request, the uncompressed version is simply provided from memory to the requesting device, without having to decompress the compressed version.

The compression techniques introduced above may be implemented in a filer used in a mirroring configuration, as noted above. In such embodiments, certain optimizations can be applied when comparing snapshots from compressed volumes. For example, during a logical mirroring operation, when comparing the VBNs in one snapshot of the file system to another snapshot of the file system to determine which blocks have changed, compression groups are handled differently than normal uncompressed blocks. When a compression group is encountered during the VBN comparison phase, rather than decompressing all of the data in the compression group in both snapshots and determining the exact data that has changed, it is assumed that all of the blocks have changed in the compression group, such that all of the data for that compression group are sent to the remote filer.

Figure 7:
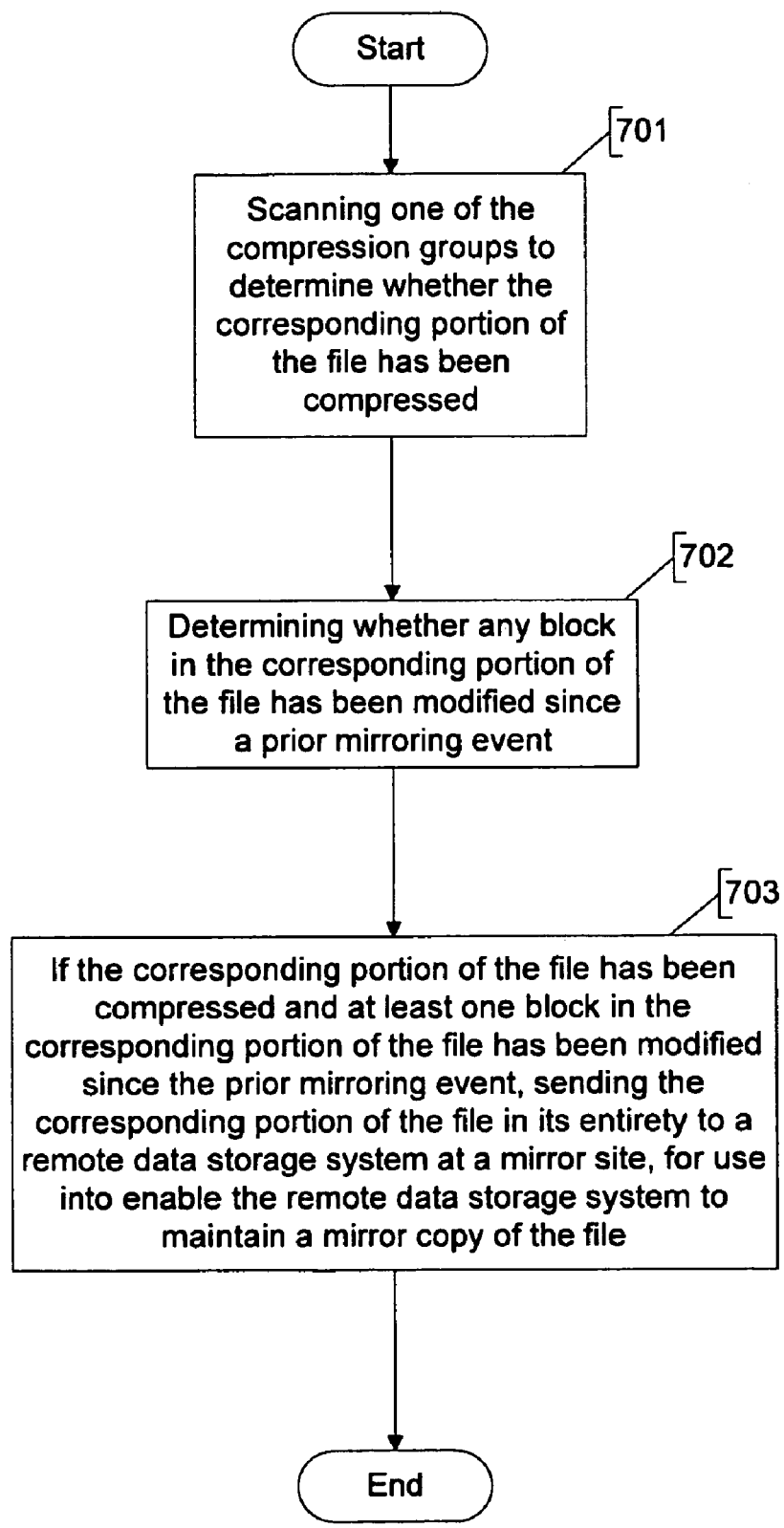
FIG. 7 shows an example of a portion of the process for performing a logical mirroring operation using the compression technique introduced herein.

FIG. 7 shows an example of a portion of the process for performing a logical mirroring operation using the compression technique introduced herein in the manner described above. The process begins with scanning one of the compression groups to determine whether the corresponding portion of the file has been compressed (701). Next, it is determined whether any block in the corresponding portion of the file has been modified since a prior mirroring event (702). If the corresponding portion of the file has been compressed and at least one block in the corresponding portion of the file has been modified since the prior mirroring event, the corresponding portion of the file is sent in its entirety to a remote data storage system at a mirror site, to enable the remote data storage system to maintain a mirror copy of the file (703).

In certain embodiments of the invention, heuristics to drive compression activity are used to make the best use of computing resources. For example, file system metadata files, directories and other files that show poor compression characteristics may not be compressed. Certain embodiments may utilize special hardware compression cards to perform compression when possible and fruitful, and then resort to software based compression when the hardware card is fully utilized or fails. This approach provides increased throughput and availability.

Compression groups as described above are applied to sets of data, which in the examples discussed above are files. The sets of data comprise subsets, such as 4-kbyte blocks in the example above. Note, however, that a "set of data" to which the above techniques are applied does not necessarily have to be a file and could instead be essentially any other unit of data. Likewise, the "subsets" of the set of data do not necessarily have to be "blocks" as defined above and could instead be essentially any other "chunk" of data smaller than the set of data itself.

Furthermore, while the techniques described above have been described in the context of a file server operating in a NAS environment, these techniques can also be applied in various other contexts. For example, the techniques described above can also be applied in a storage area network (SAN) environment. A SAN is a highly efficient network of interconnected, shared storage devices. One difference between NAS and SAN is that in a SAN, the storage server (which may be an appliance) provides a remote host with block-level access to stored data, whereas in a NAS configuration, the storage server provides clients with file-level access to stored data. Thus, the techniques introduced above are not limited to use in a file server or in a NAS environment.

Thus, a method and apparatus for compressing data in a storage server have been described. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method of operating a data storage system configured to perform data mirroring, the method comprising:
   receiving a set of data, the set of data having a first number of subsets;
   defining a compression group corresponding to the set of data, the compression group having a plurality of entries, each entry containing a pointer to a corresponding one of the subsets;
   compressing the set of data so that the set of data occupies a smaller number of the subsets than the first number;
   for each of the subsets which does not contain compressed data after said compressing, storing a predetermined value in the corresponding entry of the compression group, the predetermined value being indicative that corresponding data is compressed; and
   during a logical mirroring operation, sending the set of data in its entirety from said data storage system to a remote data storage system at a mirror site, for use in a mirror copy of the set of data, if the set of data has been compressed and any one or more of the subsets of the set of data has been modified since a prior logical mirroring operation, to enable the remote data storage system to update the mirror copy of the set of data.

2. A method as recited in claim 1, wherein the predetermined value further is indicative that the corresponding compressed data is represented in a different entry of the compression group.

3. A method as recited in claim 1, wherein the predetermined value further is indicative of the compression algorithm used to compress the data.

4. A method as recited in claim 1, wherein the set of data is a portion of a file, and each of the subsets of the set of data is a separate block within said portion of the file.

5. A method as recited in claim 4, wherein said method is performed in response to a request to write the file; and
   wherein the method further comprises writing the portion of the file to a non-volatile storage device after said compressing.

6. A method as recited in claim 5, wherein said writing the portion of the file to the non-volatile storage device is performed after said compressing but before any other portion of the file is received by the data storage system.

7. A method as recited in claim 4, wherein the compression group is a portion of an indirect node of the file.

8. A method as recited in claim 4, wherein the compression group is a portion of an inode node of the file.

9. A method as recited in claim 1, further comprising:
   saving an uncompressed version of the set of data in a memory in the data storage system after said compressing; and
   in response to a subsequent request for the set of data, using the uncompressed version of the data from the memory to fulfill the request.

10. A method as recited in claim 1, further comprising:
    receiving a read request;
    in response to the read request, determining that the read request relates to at least one subset of the set of data;
    scanning the compression group to determine whether any entry in the compression group contains the predetermined value; and
    upon detecting the predetermined value in any of the entries in the compression group, immediately beginning decompression of the set of data.

11. A method of operating a data storage system configured to perform data mirroring, the method comprising:
    receiving a file at the data storage system, a portion of the file including a number of consecutive blocks of uncompressed data, defining a compression group to represent the portion of the file, including defining the compression group to have a plurality of entries and filling each of the entries with a block number that points to a corresponding one of the blocks;
determining whether the portion of the file is suitable for compression; and
if the portion of the file is determined to be suitable for compression, then
  compressing the portion of the file so that the portion occupies a smaller number of consecutive blocks,
  for each of the number of consecutive blocks which does not contain compressed data after said compressing, storing a predetermined block number in the corresponding entry of the compression group, the predetermined block number being indicative that corresponding data is compressed and represented elsewhere in the compression group; and
at a mirroring event:
  scanning the compression group to determine whether the portion of the file has been compressed, and
  determining whether any block in the portion of the file has been modified since a prior mirroring event, and
  if the portion of the file has been compressed and at least one block in the portion of the file has been modified since the prior mirroring event, sending the portion of the file in its entirety to a remote data storage system at a mirror site, to enable the remote data storage system to maintain a mirror copy of the file.

12. A method as recited in claim 11, further comprising repeating said defining a compression group so as to define a plurality of compression groups to represent the file.

13. A method as recited in claim 12, wherein each compression group represents a portion of an indirect node of the file.

14. A method as recited in claim 12, each compression group represents a portion of an inode node of the file.

15. A method as recited in claim 11, wherein the predetermined block number further is indicative of the compression algorithm used to compress the data.

16. A method as recited in claim 11, wherein the file comprises a plurality of portions, each including a plurality of blocks of data, and wherein the method further comprises repeating said defining, determining, compressing, and storing, for each of the plurality of portions.

17. A method as recited in claim 11, further comprising, in response to a read request, determining that the portion of the file is compressed by scanning the compression group for the predetermined block number.

18. A method as recited in claim 11, wherein said method is performed in response to a request to write the file; and
  wherein the method further comprises writing the portion of the file to a non-volatile storage device after said compressing.

19. A method as recited in claim 18, wherein said writing the portion of the file to the non-volatile storage device is performed after said compressing but before any other portion of the file is received by the data storage system.

20. A method as recited in claim 18, further comprising:
  saving an uncompressed version of the portion of the file in a memory in the data storage system after said compressing; and
  in response to a subsequent request on the portion of the file, using the uncompressed version from the memory to fulfill the request, without decompressing the compressed portion of the file.

21. A method as recited in claim 11, further comprising;
receiving a read request at the data storage system;
in response to the read request, determining that the read request relates to at least one block of the portion of the file;
scanning the compression group to determine whether any entry in the compression group contains the predetermined block number; and
upon detecting the predetermined block number in any of the entries in the compression group, immediately beginning decompression of the portion of the file.

22. A method as recited in claim 11, wherein consecutive entries in the compression group correspond to consecutive blocks in the file.

23. A method of compressing data in a data storage system, the method comprising:
receiving a request to write a file at the data storage system;
in response to the request, identifying a plurality of portions of the file, each portion including a number of consecutive blocks of uncompressed data;
defining a separate compression group to represent each of the portions, so as to define a plurality of compression groups to represent the file, including defining each compression group to include a plurality of entries, wherein each of the entries is filled with a block number that points to a corresponding one of the blocks, wherein consecutive entries in the compression group correspond to consecutive blocks in the file;
determining whether each of the portions of the file is suitable for compression;
for each portion, if the portion is determined to be suitable for compression,
  compressing the portion into a smaller number of consecutive blocks, and
  for each block which does not contain compressed data after said compressing, storing a predetermined block number in the corresponding entry of the compression group, the predetermined block number being indicative that corresponding data is compressed and represented elsewhere in the compression group;
writing the file to a non-volatile storage device after said compressing; and
at a mirroring event,
  scanning one of the compression groups to determine whether the corresponding portion of the file has been compressed, and
  determining whether any block in the corresponding portion of the file has been modified since a prior mirroring event, and
  if the corresponding portion of the file has been compressed and at least one block in the corresponding portion of the file has been modified since the prior mirroring event, sending the corresponding portion of the file in its entirety to a remote data storage system at a mirror site, to enable the remote data storage system to maintain a mirror copy of the file.

24. A method as recited in claim 23, wherein the predetermined block number further is indicative of the compression algorithm used to compress the data.

25. A method as recited in claim 23, wherein each of the compression groups represents a portion of an indirect node of the file.

26. A method as recited in claim 23, wherein each of the compression groups represents a portion of an inode node of the file.

27. A method as recited in claim 23, further comprising, in response to a read request, determining that a portion of the file is compressed by scanning the corresponding compression group for the predetermined block number.

28. A storage server comprising:
a processor;
a network communication interface to provide the data storage server with data communication with a plurality of clients over a network;
a storage interface to provide the data storage server with data communication with a set of mass storage devices; and
a memory containing code which, when executed by the processor, causes the data storage server to execute a first process of managing data in the mass storage devices on behalf of the clients, the first process comprising
receiving a set of data, the set of data having a first number of subsets,
creating a compression group corresponding to the set of data, the compression group having a plurality of entries, each entry containing a pointer to a corresponding one of the subsets,
compressing the set of data so that the set of data occupies a smaller number of the subsets than the first number, and
for each of the subsets which does not contain compressed data after said compressing, storing a predetermined value in the corresponding entry of the compression group, the predetermined value being indicative that corresponding data is compressed;
the memory further containing code which, when executed by the processor, causes the data storage server to execute a second process of causing data stored in the mass storage devices to be mirrored at a remote site, the second process comprising, at a mirroring event, sending the set of data in its entirety to a remote data storage system at a mirror site, for use by the remote data storage system to update a mirror copy of the set of data, if at least one of the subsets of the set of data has been modified since a prior mirroring event.

29. A storage server as recited in claim 28, wherein said process of managing data is performed by a file system layer of the data storage server.

30. A storage server as recited in claim 28, the predetermined value further being indicative that the corresponding compressed data is represented in a different entry of the compression group.

31. A storage server as recited in claim 28, wherein the predetermined value further is indicative of the compression algorithm used to compress the data.

32. A storage server as recited in claim 28, wherein the set of data is a portion of a file, and wherein each of the subsets of the set of data is a separate block within said portion of the file.

33. A storage server as recited in claim 32, wherein the process of storing data in the mass storage devices is performed in response to a request to write the file from one of the clients; and
wherein the process further comprises writing the portion of the file to a non-volatile storage device after said compressing.

34. A storage server as recited in claim 33, wherein said writing the portion of the file to the non-volatile storage device is performed after said compressing but before any other portion of the file is received by the data storage system.

35. A storage server as recited in claim 32, wherein the compression group represents a portion of an indirect node of the file.

36. A storage server as recited in claim 32, wherein the compression group represents a portion of an inode node of the file.

37. A storage server as recited in claim 28, wherein the memory further contains code which, when executed by the processor, causes the data storage server to execute a third process, said third process comprising:
saving an uncompressed version of the portion of the set of data in a memory in the data storage system after said compressing; and
in response to a subsequent read on the portion of the set of data, using the uncompressed version from the memory to fulfill the request, without decompressing the portion of the set of data.

38. A storage server as recited in claim 28, wherein the memory further contains code which, when executed by the processor, causes the data storage server to execute a third process, said third process comprising:
receiving a read request;
in response to the read request, determining that the read request relates to at least one subset of the set of data;
scanning the compression group to determine whether any entry in the compression group contains the predetermined value; and
upon detecting the predetermined value in any of the entries in the compression group, immediately beginning decompression of the set of data.

* * * * *